United States Patent
Simmons et al.

(10) Patent No.: US 9,291,058 B2
(45) Date of Patent: Mar. 22, 2016

(54) MACHINING PROCESS AND APPARATUS FOR MACHINING

(71) Applicant: ROLLS-ROYCE PLC, London (GB)

(72) Inventors: Christopher Alan Simmons, Burton on Trent (GB); Mark David Hancock, Derby (GB)

(73) Assignee: ROLLS-ROYCE plc, London (GB)

( * ) Notice: Subject to any disclaimer, the term of this patent is extended or adjusted under 35 U.S.C. 154(b) by 174 days.

(21) Appl. No.: 13/973,489

(22) Filed: Aug. 22, 2013

(65) Prior Publication Data

US 2014/0059856 A1    Mar. 6, 2014

(30) Foreign Application Priority Data

Sep. 3, 2012   (GB) .................................. 1215626.1

(51) Int. Cl.
| | | |
|---|---|---|
| B21K 3/04 | (2006.01) | |
| B23P 15/02 | (2006.01) | |
| B21D 53/78 | (2006.01) | |
| F01D 5/14 | (2006.01) | |
| G05B 19/404 | (2006.01) | |
| B23P 15/04 | (2006.01) | |

(52) U.S. Cl.
CPC . *F01D 5/14* (2013.01); *B23P 15/04* (2013.01); *G05B 19/404* (2013.01); *G05B 2219/37205* (2013.01); *G05B 2219/45147* (2013.01); *G05B 2219/49025* (2013.01); *Y10T 29/49336* (2015.01)

(58) Field of Classification Search
CPC ................... Y10T 29/49336; Y10T 29/49337; Y10T 29/49339; G05B 19/402; G05B 19/4093; G05B 19/40937; G05B 19/40938; G05B 19/4097; G05B 19/4099; G05B 2219/45147; G05B 2219/37205; B23P 15/04; F01D 5/14
See application file for complete search history.

(56) References Cited

U.S. PATENT DOCUMENTS

| | | | |
|---|---|---|---|
| 3,512,431 A * | 5/1970 | Caja | 76/107.1 |
| 5,558,784 A | 9/1996 | Obrist | |
| 5,898,590 A * | 4/1999 | Wampler et al. | 700/174 |
| 8,140,179 B2 * | 3/2012 | Drechsler et al. | 700/212 |
| 8,532,807 B2 * | 9/2013 | Metzger | 700/98 |

(Continued)

FOREIGN PATENT DOCUMENTS

| | | | | |
|---|---|---|---|---|
| EP | 1 170 648 A1 | 1/2002 | | |
| EP | 2816430 A1 * | 12/2014 | ............ | G05B 19/42 |

(Continued)

OTHER PUBLICATIONS

British Search Report issued in Application No. 1215626.1; Dated Dec. 6, 2012.

*Primary Examiner* — Essama Omgba
(74) *Attorney, Agent, or Firm* — Oliff PLC

(57) ABSTRACT

A method of determining a tool path to machine a component, the method comprising the steps of: securing the component to a fixture having a zero point alignment datum, the component and the fixture having respective mobile reference points; aligning the fixture mobile reference points to target reference points on the machine tool; aligning a digitized model of the component to the component mobile reference points; determining the position of the component on the fixture from the component mobile reference points and the fixture mobile reference points; and adjusting a nominal tool path for the machine tool dependent on the position of the component.

10 Claims, 5 Drawing Sheets

(56) References Cited

U.S. PATENT DOCUMENTS

| | | | |
|---|---|---|---|
| 8,578,581 B2* | 11/2013 | Bellerose et al. | 29/407.09 |
| 8,903,530 B2* | 12/2014 | Metzger | 700/98 |
| 2006/0181236 A1* | 8/2006 | Brogardh | 318/568.1 |
| 2008/0173624 A1* | 7/2008 | Drechsler et al. | 219/125.1 |
| 2008/0250659 A1* | 10/2008 | Bellerose et al. | 33/1 MP |
| 2009/0069945 A1 | 3/2009 | Burgkart | |
| 2010/0023157 A1* | 1/2010 | Burgess et al. | 700/186 |
| 2010/0131234 A1* | 5/2010 | Stewart et al. | 702/152 |
| 2012/0310399 A1* | 12/2012 | Metzger | 700/98 |
| 2013/0231892 A1* | 9/2013 | Franke et al. | 702/170 |
| 2014/0018948 A1* | 1/2014 | Metzger | 700/98 |
| 2014/0046478 A1* | 2/2014 | Bellerose et al. | 700/182 |
| 2014/0373503 A1* | 12/2014 | Hanlon | 60/39.01 |

FOREIGN PATENT DOCUMENTS

| | | | | |
|---|---|---|---|---|
| GB | 2505497 A | * | 3/2014 | B23P 15/02 |
| WO | WO 94/11795 A1 | | 5/1994 | |
| WO | WO 2008124915 A1 | * | 10/2008 | G05B 19/401 |

* cited by examiner

MACHINING PROCESS AND APPARATUS FOR MACHINING

TECHNICAL FIELD OF INVENTION

The invention relates to the manufacture of components and particularly the manufacture of aerofoils for gas turbine engines and even more particularly the manufacture of fan blades.

BACKGROUND OF INVENTION

Aerofoils such as fan blades for a gas turbine engine are often manufactured as what is commonly known in the art as "wide chord blades". The blades, typically formed of titanium, have a leading edge, a trailing edge and pressure and suction flanks extending between the leading and trailing edges and are manufactured from a series of plates which are laminated together before a gas injected between the sheets causes the blade to inflate. The blade is subsequently twisted and the external surfaces machined and polished to its finished form.

The flanks, leading and trailing edges may need to be machined and it is an object of the present invention to seek to provide an improved method of completing an operation on an aerofoil.

STATEMENTS OF INVENTION

According to a first aspect of the invention there is provided a method of determining a tool path to machine a component, the method comprising the steps of: securing the component to a fixture having a zero point alignment datum, the component and the fixture having respective mobile reference points; aligning the fixture mobile reference points to target reference points on the machine tool; aligning a digitised model of the component to the component mobile reference points; determining the position of the component on the fixture from the component mobile reference points and the fixture mobile reference points; and adjusting a nominal tool path for the machine tool dependent on the position of the component.

Preferably the method further comprises the steps of locating the fixture on the machine tool using the zero point alignment datum and machining the component using the adjusted tool path.

Preferably the nominal tool path is adjusted before the fixture is located on the machine tool.

The location of the mobile reference points may be detected without contact of a detector.

Preferably the mobile reference points emit or reflect radiation.

The location of one or more of the mobile reference points may be determined by a touch probe.

Preferably the component is an aerofoil having a foot, a tip, a first flank and an opposing second flank, wherein the fixture has a foot clamp for clamping the foot of an aerofoil and a tip clamp for clamping the tip of the aerofoil, and further having an array of supports between the foot clamp and the tip clamp, each support within the array being independently addressable to one of the aerofoil flanks when the aerofoil is secured to the fixture.

The tip of the aerofoil may have a surplus of material with the tip clamp clamping the surplus material.

Preferably each support is functionally connected to pneumatic or hydraulic actuator.

Each support may have a locking device which locks the support against the aerofoil flank.

Preferably the fixture comprises at least three alignment pillars that are located beyond the array of support pillars and which may be detected by non contact means to provide mobile reference points.

DETAILED DESCRIPTION OF INVENTION

Figure 1:
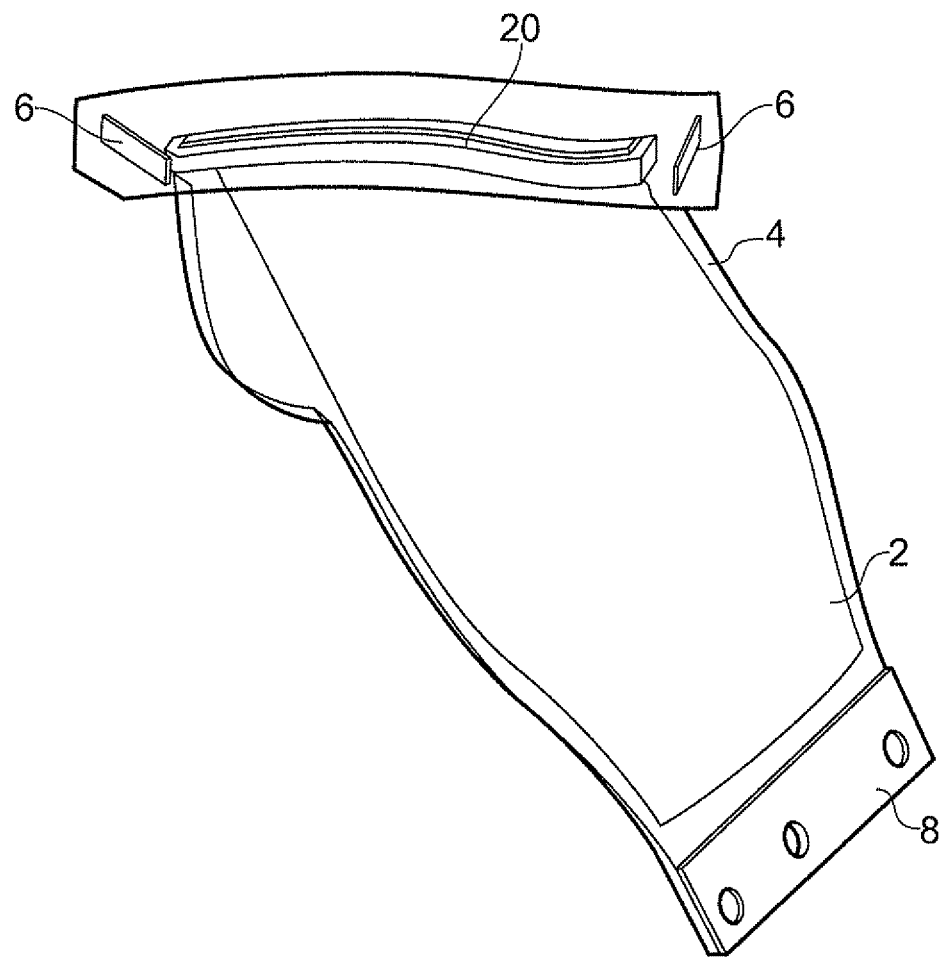
FIG. 1 depicts a body of material and the profile of a nominal machined aerofoil.

FIG. 1 depicts a finished fan blade 2 within a body of material 4. The body of material is indicative of the stock material which is the condition of supply of the component prior to the machining operation. Additional material is provided around the blade to permit the external surface to be machined to a desired tolerance and which leaves at least a minimum material between the inner volume and the external surface.

The stock material 4 is provided as a laminate of layers and two test pieces 6 are provided in the foot portion of the stock material and which are used to test the weld integrity of the stock. These lie outside the form of the finished blade and are removed during the machining of the stock material to the finished blade form.

Figure 2:
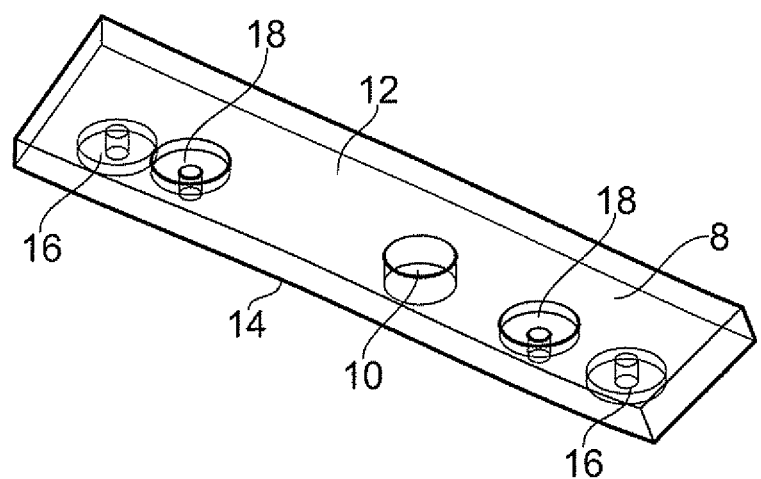
FIG. 2 depicts a datum feature
Figure 3:
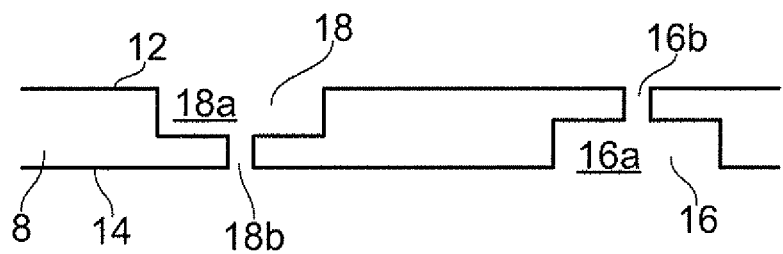
FIG. 3 depicts a cross-section through the datum feature of FIG. 2.

The stock material is also provided with a body, or letterbox, of material 8 beyond the tip of the blade which is machined to assist with the support and alignment of the stock material so that the sides of the blade 4 may be machined in separate operations. The Figure shows the letterbox in partially machined form. Beneficially the letterbox can provide both an alignment and clamping location The letterbox 8 is shown in more detail in FIG. 2 and is provided with a series of datum features provided in a top surface 12 and the bottom surface 14. A first set of datum features 18 are provided which are formed in the top surface and have a first portion 18a which is a circular cut-out with a first diameter in the top surface and a second portion 18b which is an aperture extending from the base of the circular cut-out to the bottom surface 14. The diameter of the second portion is less than the diameter of the first portion.

A second set of datum features 16 are provided which are formed in the bottom surface 14 and have a first portion 16a which is a circular cut-out with a first diameter in the top surface and a second portion 16b which is an aperture extending from the base of the circular cut-out to the top surface 12. The diameter of the second portion is less than the diameter of the first portion.

The first and second datum sets are manufactured sequentially preferably at the stage in the process at which each of the sides are machined. The datum features assist in the manufacture of the blade in a number of discrete steps and the first set of datum features 18 are used to determine the location of the second set of datum features 16.

In the first step of the exemplary method the foot 20 of the blade is machined in a fixture along with the test pieces 6 and the first side of the letterbox 8. During this step the first set of datum features 18 are also machined with the depth of the first portion 18a from the surface 12 being carefully controlled to provide an accurate datum. The location of the datum features is controlled relative to the position of the machined foot.

Figure 4:
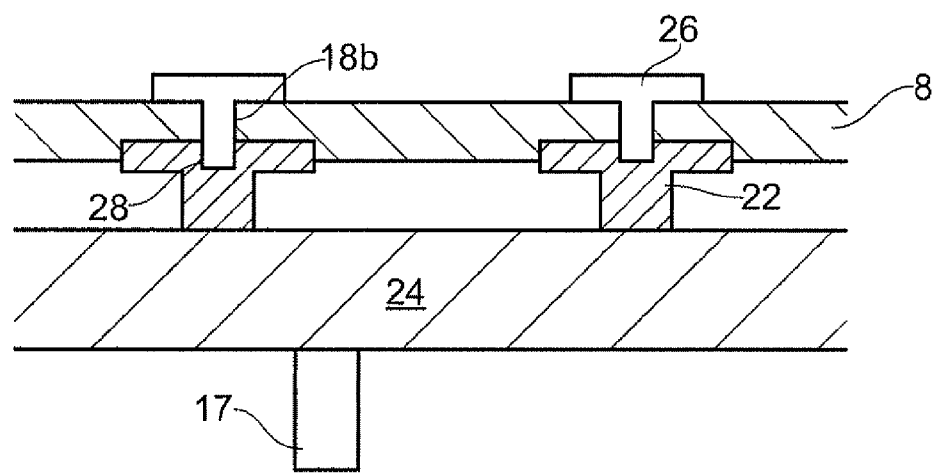
FIG. 4 depicts an article mounted to a fixture through datum feature.

The blade with the machined foot is then addressed to a further fixture 24 as shown in FIG. 4 using the datum features 18. Two datum features 18 have a depth selected to locate the blade in a desired orientation on the fixture. The depths may provide two co-planar surfaces on which the blade tip can rest on the fixture. The fixture can also be provided with corresponding pads 22 the height of which can be adjusted to ensure that each pad rest on its co-planar surface.

The second portion 18b of the datum features 18 extends through the letterbox 8 to provide an aperture which is aligned with an aperture 28 in the pad 22. A screw 26 is inserted through the aperture 18a and tightened to the pad using a screw thread and a corresponding screw thread on the internal surface of the aperture 28 in the pad. The screw securely bonds the letterbox and hence the blade to fixture 24.

As the location of the datum features 18 relative to the foot is known the surface 4 of the blade to be machined is relatively accurately positioned ready for machining, but fine alignment may be used to further improve the positional accuracy of the blade. The surface is then machined. As part of the machining step the second set of datum features 16 are formed in the letterbox 8. As the position of the first datum features 18 is known through the positioning of the screw securing the letterbox to the fixture it is possible to accurately align the second datum features to both the first datum feature and the foot 20.

Following completion of the first side machining the blade can be removed from the fixture, turned over and then secured again using a similar method and pads as per the first side. Beneficially the known location of the second datum features 16 relative to the location of the first datum features and the foot permits the second side to be known relatively accurately to reduce alignment time of the machine tool to the second surface 2. The second surface is machined and then the letterbox is removed to provide the finished blade.

Figure 5:
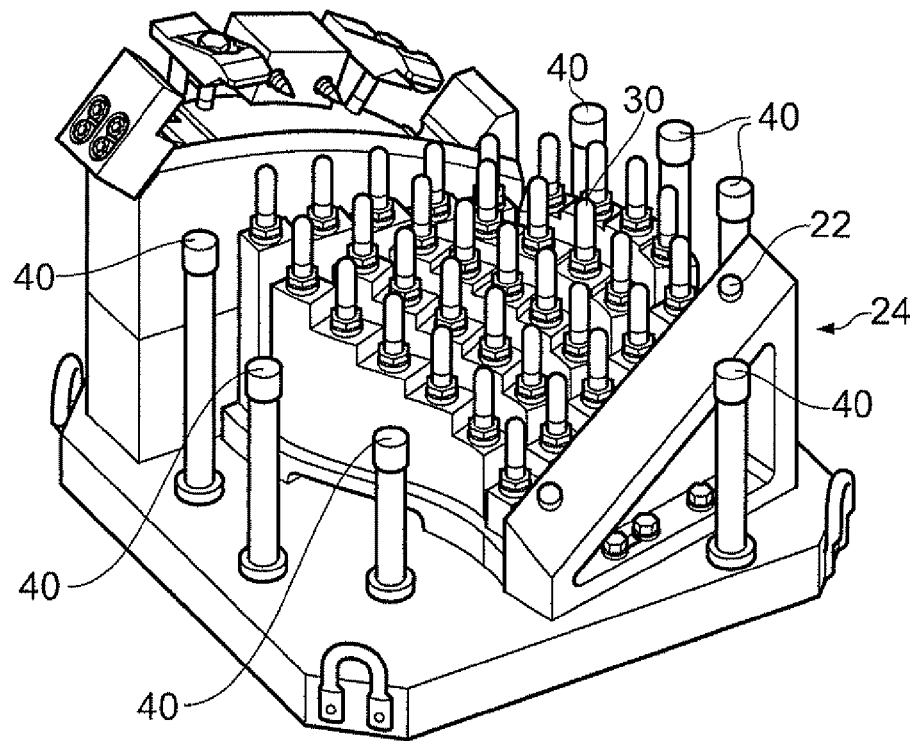
FIG. 5 is a perspective view of a fixture in accordance with an embodiment of the invention
Figure 6:
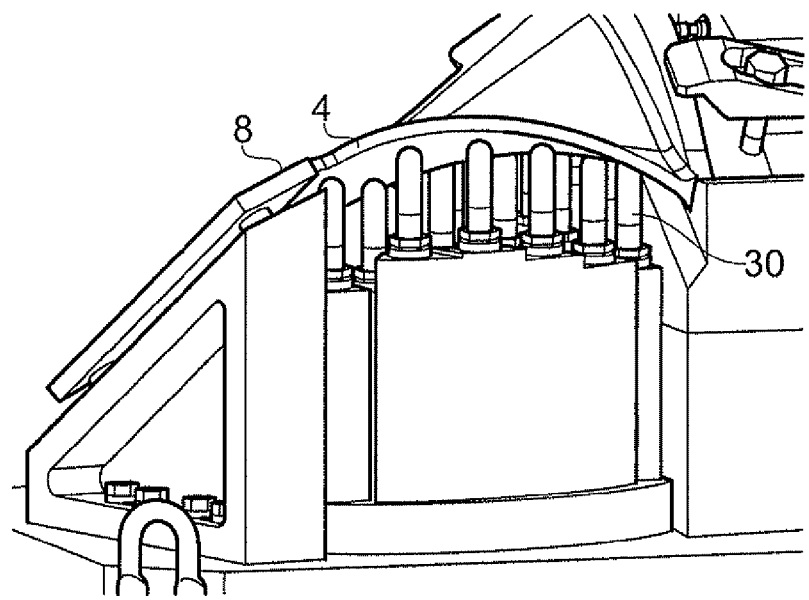
FIG. 6 is an alternative perspective view of the fixture of FIG. 5.

The blade surfaces 2, 4 are relatively thin and may be subject to machining chatter or distortion caused by tool pressure. To minimise distortion and improve clamping the fixture is provided, as shown in FIG. 5, with a plurality of support pins which are addressable to the surface opposite the surface being machined.

Following secure clamping of the blade at the foot and letterbox the pins are driven up to touch the underside of the blade using hydraulic actuation at low pressure, or preferably pneumatic actuation. Preferably air pressure is used with the pressure used being insufficient to cause permanent distortion of the blade even if pressure is applied following first contact. The pins are then locked in position using an alternative clamping force, preferably hydraulic, in a direction orthogonal to that required to address the pin to the surface. Beneficially a large clamping force can be applied in this second direction as there is no risk of the force distorting the blade.

An array of pins 30 are used so as to provide a uniform area of support directly opposite to the machining forces.

One of the benefits of the described clamping system is that the blade can be rigidly secured to the fixture independently of the tool which machines the surfaces. This permits accurate alignment, or determination of the position of the surface to be machined, relative to a datum on the fixture. This measurement can be time consuming which, if performed in the machining tool, can slow production rates below the minimum acceptable.

The fixture is provided with a plurality of calibration features 40 which are visible to the alignment device after the blade is secured to the fixture. The position of the blade on the fixture is controlled to reasonable tolerance due to the datum features 18, 16 and 22 but exact alignment is not required. The clamps being provided to grip the component rather than accurately set its position.

Figure 7:
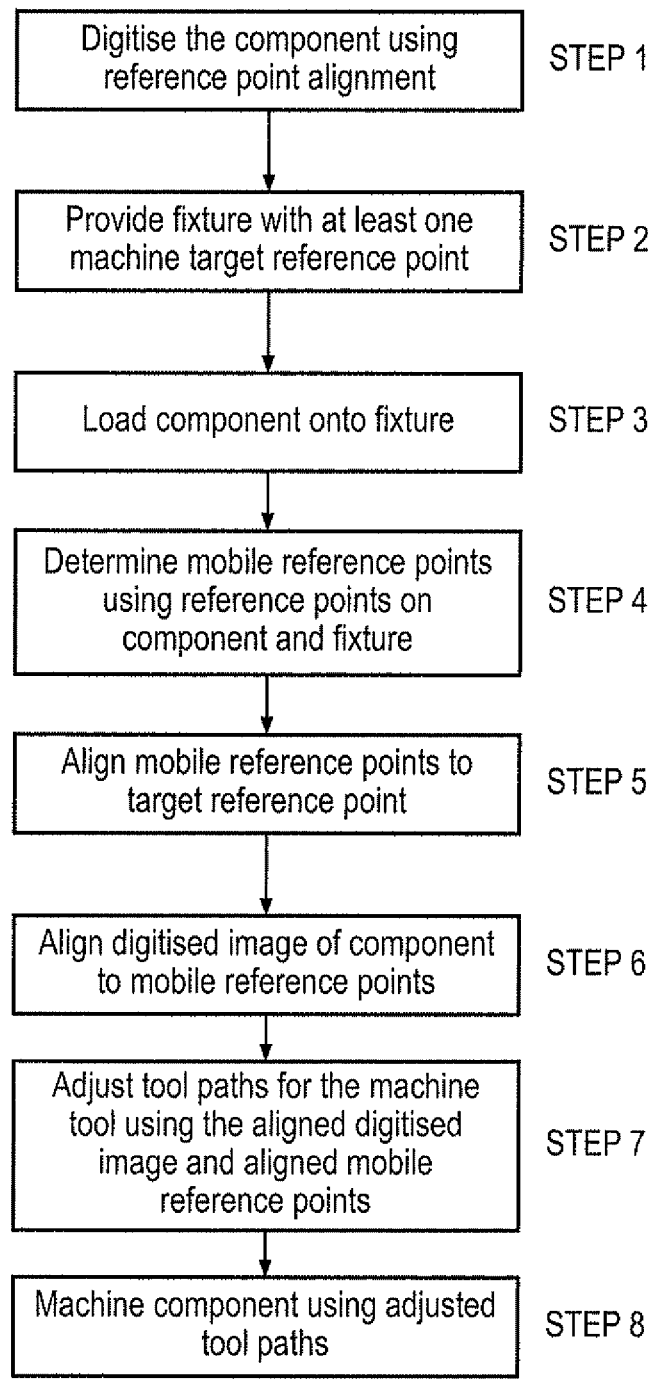
FIG. 7 is a flow sheet showing a number of steps in a machining process

A schematic of the process steps for the method of determining the machining process is shown in FIG. 7. In Step 1 a digital model of the component is determined using an optical digitising system using reference point alignment techniques known in the art. The model, preferably determined before the blade is attached to the fixture, takes a reference point system that combines individual measurements into a single co-ordinate system. The reference points may be non-contact points and which are fluorescent, reflective or radiation absorbent features that are applied to the component and optionally directly to the fixture in positions around the component. Alternatively the individual measurements may be determined by contact techniques such as CMM. The reference points may be temporarily secured to the component or may be a permanent feature e.g. a corner, edge or other identifiable feature.

Sensors are used to digitise an image of the component and the surface data is aligned to the reference points. Where reference points are applied to the component they are captured and digitised with the surface data and become an inherent element of the resultant 3D model.

The fixture is provided with at least one machine target reference point, Step 2, but preferably at least three are provided to enable accurate triangulation. In Step 3, the component, or blade is loaded to the fixture using the method described above and clamped. A photogrammetry system is used to monitor the distortion of the blade as it is secured to the fixture. The distortion can be measured as a deformation vector and the clamping adjusted dynamically to minimise the distortion to below defined limits, preferably 80 microns.

Output from the photogrammetry system can be used to determine the relationship between the clamped blade and the fixture and identify any change or movement in the pattern of reference points as the blade is clamped or following clamping.

Fixed photogrammetric reference points 40 which are mounted on pillars are pre-measured using a touch probe on the machine tool. Their coordinates are known with respect to the fixture zero point location system which permits the fixture to be repeatedly loaded to the machine tool in a known position. The location system uses a zero point datum 17 as known in the technical field and which has accurately and repeatedly locate the fixture in the machine tool to within 5 microns of its intended position.

Once the blade has been fully clamped the photogrammetry system is used to measure the assembled set of reference points on the blade as well as the fixed photogrammetric reference points on the fixture to provide mobile reference points, Step 4.

The fixture and blade is then transferred to the machine tool and the file describing the machine co-ordinates of the fixed photogrammetric reference points of the fixture loaded to provide a number of target reference points. Each fixture may be slightly different so it is beneficial to provide a specific file for each fixture. Since the location of the fixture to the machine tool is accurately known because of the zero point location and the location of the component to the fixture is accurately known it is possible to determine the position of the component relative to the machine tool before the fixture is mounted thereto.

The mobile reference points are aligned to the target reference points which are the true machine co-ordinates, Step 5, and the digitised image or model subsequently aligned to the mobile reference points using the reference points that were captured with it, Step 6.

Beneficially, this aligns the digitised image to the machine co-ordinates and represents the true location of the blade with respect to the machine co-ordinates. Once this is known an alignment may be calculated which adjusts the co-ordinates of the toolpaths to the true position of the component on the machine tool, Step 7. The component may then be machined using the adjusted tool paths, Step 8.

One of the many advantages is that the point to point alignment is more accurate and robust than point-to-surface alignment. In addition there is significant time saving since once the clamping has been completed and a measurement of the full set of assembled reference points has been made, the alignment can be calculated and the tool paths specified, adjusted and loaded into the machine tool before the fixture and the component is loaded onto the machine tool. As a further advantage any discrepancies above a predetermined threshold between aligned component and the expected location provides an automatic check of the integrity of the fixture points by comparison. Where the discrepancy is above the threshold touch or other contact probes may be used to further check values. The approach also supports a more flexible approach to high volume manufacture as no further probing may be needed and a shorter turnaround is possible. Fully automatic machining of the surface may be possible and robot controlled.

Although the invention has been described with respect to fan blades it is equally applicable to other aerofoil types such as compressor blades and vane, turbine blades and vanes, aircraft wings and ailerons, or other plate shaped components.

The invention claimed is:

1. A method of determining a tool path to machine a component, the method comprising the steps of:

securing the component to a fixture having a zero point alignment datum, the component and the fixture having respective mobile reference points;

aligning the fixture mobile reference points to target reference points on a machine tool;

aligning a digitized model of the component to the component mobile reference points;

determining the position of the component on the fixture from the component mobile reference points and the fixture mobile reference points; and adjusting a nominal tool path for the machine tool dependent on the position of the component, wherein the nominal tool path is adjusted before the fixture is located on the machine tool.

2. A method according to claim 1, further comprising the steps of locating the fixture on the machine tool using the zero point alignment datum and machining the component using the adjusted tool path.

3. A method according to claim 1, wherein the mobile reference points may be detected without contact of a detector.

4. A method according to claim 1, wherein the mobile reference points emit or reflect radiation.

5. A method according to any one of claims 1, wherein the location of one or more of the mobile reference points is determined by a touch probe.

6. A method according to claim 1, wherein the component is an aerofoil having a foot, a tip, a first flank and an opposing second flank, wherein the fixture has a foot clamp for clamping the foot of an aerofoil and a tip clamp for clamping the tip of the aerofoil, and further having an array of supports between the foot clamp and the tip clamp, each support within the array being independently addressable to one of the aerofoil flanks when the aerofoil is secured to the fixture.

7. A method according to claim 6, wherein the tip of the aerofoil has a surplus of material with the tip clamp clamping the surplus material.

8. A method according to claim 6, wherein each support is functionally connected to pneumatic or hydraulic actuator.

9. A method according to claim 8, wherein each support has a locking device which locks the support against the aerofoil flank.

10. A method according to claim 6, wherein the fixture comprises at least three alignment pillars that is located beyond the array of supports and which may be detected by non contact means to provide mobile reference points.

* * * * *